(12) United States Patent
Miyajima

(10) Patent No.: US 6,825,834 B2
(45) Date of Patent: Nov. 30, 2004

(54) ACTIVE MATRIX DISPLAY DEVICE

(75) Inventor: Yasushi Miyajima, Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 214 days.

(21) Appl. No.: 09/985,934

(22) Filed: Nov. 6, 2001

(65) Prior Publication Data
US 2002/0057266 A1 May 16, 2002

(30) Foreign Application Priority Data
Nov. 6, 2000 (JP) ........................................ 2000-337078

(51) Int. Cl.⁷ .............................................. G09G 5/00
(52) U.S. Cl. ........................... 345/204; 345/87; 345/90; 345/92; 345/205
(58) Field of Search ....................... 345/27, 90, 92–93, 345/98, 100, 204–205

(56) References Cited

U.S. PATENT DOCUMENTS

| 5,712,652 A | 1/1998 | Sato et al. |
| 5,790,090 A | 8/1998 | Libsch et al. |
| 5,945,972 A | * 8/1999 | Okumura et al. ............. 345/98 |
| 5,952,991 A | 9/1999 | Akiyama |
| 5,977,940 A | 11/1999 | Akiyama et al. |
| 6,023,308 A | * 2/2000 | Takemura ..................... 349/42 |
| 6,072,454 A | 6/2000 | Nakai et al. |
| 6,443,487 B1 | * 9/2002 | Suyama ....................... 280/733 |
| 6,522,079 B1 | * 2/2003 | Yamada ................... 315/169.3 |

FOREIGN PATENT DOCUMENTS

| EP | 0 797 182 | 9/1997 |
| EP | 1 020 840 | 7/2000 |
| JP | 58-23091 | 2/1983 |
| JP | 58023091 | * 10/1983 |
| JP | 08-194205 | 7/1996 |
| JP | 09-236823 | 9/1997 |
| JP | 2001-242819 | 9/2001 |

* cited by examiner

Primary Examiner—Vijay Shankar
Assistant Examiner—Leonid Shapiro
(74) Attorney, Agent, or Firm—Morrison & Foerster LLP

(57) ABSTRACT

The invention is directed to reducing the energy consumption of an LCD display capable of presenting both moving pictures and still images. Since the retaining circuit 110 for retaining the image signal is disposed for each of the pixel elements, the switching between the moving picture mode and the still image mode is possible. Also, the power line supplying the driver voltage and the reference voltage to the retaining circuit 110 is shared by two rows adjacent to the power line. Thus, compared to the case where the power line is provided for each of the rows, the number of the power lines can be reduced in half, improving the efficiency of the circuit space utilization, leading to the size reduction of the retaining circuit 110.

13 Claims, 7 Drawing Sheets

ACTIVE MATRIX DISPLAY DEVICE

BACKGROUND OF THE INVENTION

1. Field of the Invention

This invention relates to an active matrix display device, especially to an active matrix display device having a plurality of retaining circuits provided for each of the pixel elements.

2. Description of the Related Arts

There has been a great demand in the market for portable communication and computing devices such as a portable TV and cellular phone. All these devices need a small, light-weight and low-consumption display device, and development efforts have been made accordingly.

FIG. 6 shows a circuit diagram corresponding to a single pixel element of a conventional liquid crystal display device. A gate signal line 51 and a drain signal line 61 are placed on an insulating substrate (not shown in the figure) perpendicular to each other. A pixel element selection TFT 65 connected to the two signal lines 51, 61 is formed near the crossing of the two signal lines 51, 61. The source 65 of the pixel element selection TFT 65 is connected to a pixel element electrode 17 of the liquid crystal 21.

A storage capacitor element 85 holds the voltage of the pixel element electrode 17 during one field period. A terminal 86, which is one of the terminals of the storage capacitor element 85, is connected to the source 65 of the pixel element selection TFT 65, and the other terminal 87 is provided with a voltage common among all the pixel elements.

When a gate signal is applied to the gate signal line 51, the pixel element selection TFT 65 turns to an on-state. Accordingly, an analog image signal from the drain signal line 61 is applied to the pixel element electrode 17, and the liquid crystal 21 through the pixel element electrode 17, and the storage capacitor element 85 holds the voltage. The voltage of the image signal is applied to the liquid crystal 21 through the pixel element electrode 17, and the liquid crystal 21 aligns in response to the applied voltage for providing a liquid crystal display image. Disposing the pixel elements as a matrix as described above provides a basic configuration of a LCD.

The conventional LCD is capable of showing both moving images and still images. There is a need for the display to show both a moving image and a still image within a single display. One such example is to show a still image of a battery within area in a moving image of a cellular phone display to show the remaining amount of the battery power.

However, the configuration shown in FIG. 6 requires a continuous rewriting of each pixel element with the same image signal at each scanning in order to provide a still image. This is basically to show a still-like image in a moving image mode, and the scanning signal needs to activate the pixel element selection TFT 70 by the gate signal at each scanning.

Accordingly, it is necessary to operate a driver circuit which generates a drive signal for the gate signals and the image signals, and an external LSI which generates various signals for controlling the timing of the drive circuit, resulting in a consumption of a significant amount of electric power. This is a considerable drawback when such a configuration is used in a cellular phone device, which has only a limited power source. That is, the time a user can use the telephone under one battery charge is considerably short.

Japanese Laid-Open Patent Publication No. Hei 8-194205 discloses another configuration for display device suited for portable applications. This display device has a static memory for each of the pixel elements. FIG. 7 is a plan view showing the circuit diagram of the active matrix display device with a retaining circuit disclosed in Japanese Laid-Open Patent Publication No. Hei 8-194205. A plurality of gate signal lines 51 and reference lines 52 are disposed in a predetermined direction. And a plurality of drain lines 61 are disposed in the direction perpendicular to the predetermined direction. Between a retaining circuit 54 and a pixel element electrode 17, a TFT 53 is formed. By displaying image based on the data retained in the retaining circuit, the operation of a gate driver 50 and a drain driver 60 is stopped for the reduction of the electric power consumption.

FIG. 8 shows a circuit diagram corresponding to a single pixel element of the liquid crystal display device. On a substrate, the pixel element electrode is disposed in a matrix configuration. Between the pixel element electrodes 17, the gate signal line 51 and the drain signal line 61 are placed perpendicular to each other. The reference line 52 is disposed parallel to the gate signal line 51, and the retaining circuit 54 is formed near the crossing of the gate signal line 51 and the drain signal line 61. A switching element 53 is formed between the retaining circuit 54 and the pixel element electrode 17. A static memory (Static Random Access Memory: SRAM), in which two inverters 55 and 56 are positively fed back to each other, works as the retaining circuit for holding the digital image signal. Since the SRAM dose not need to refresh the memory for retaining the data, the SRAM, which is different from DRAM, is suitable for the display device.

In this configuration, the switching element 53 controls the resistance between a reference line and a pixel element electrode 17 in response to the divalent digital image signal held by the static memory and outputted from the retaining circuit in order to adjust the biasing of the liquid crystal 21. The common electrode, on the other hand, receives an AC signal Vcom. Ideally, this configuration does not need refreshing the memory when the image stays still for a period of time.

However, when the static RAM is used in the retaining circuit 54, the number of the required transistors of the retaining circuit is 4 or 6, resulting in the enlargement of the circuit. Also, since the static RAM occupies the space between the pixel element electrodes 17, the area for the pixel element electrode reduces accordingly. As a result; the light manipulation area of the liquid crystal display device is limited, and the size of a single pixel element is larger than it is desired for the device design.

SUMMARY OF THE INVENTION

This invention is directed to the size reduction of the picture element or the increase of the light manipulation area of a display device with a retaining circuit for holding the data in response to the pixel element voltage.

This invention provides an active matrix display device having a plurality of pixel element electrodes disposed as a matrix, a plurality of retaining circuits disposed for the pixel element electrodes for holding a voltage determining an application of a voltage to the pixel element electrode, and a power line which supplies a predetermined voltage to the retaining circuit. The power line extends in one direction of the matrix and is commonly used by the retaining circuits of the pixel element electrodes forming a line of the matrix in the same direction. This power line is also used by the retaining circuits of the pixel element electrodes forming another line of the matrix in the same direction. The two lines are next to each other.

In this configuration, the number of the power lines of the active matrix display device can be reduced in half comparing to the case where the power line is provided for each of the rows. Thus, it is possible to achieve the size reduction of the pixel element, leading to the overall size reduction of an active matrix display device.

The active matrix display device of this invention also provides an active matrix display device including a plurality of pixel element electrodes disposed as a matrix, a plurality of gate signal lines disposed in the row direction of the matrix, a plurality of drain signal lines disposed in the columnar direction of the matrix. This active matrix display device also includes a first display circuit which supplies a signal corresponding to the image signal fed from the drain signal line to the pixel element electrode selected by the scanning signal inputted from the gate signal line; and a second display circuit having a retaining circuit which retains a voltage of the image signal fed from the drain signal line in response to the scanning signal inputted from the gate signal line. This second display circuit supplies a signal corresponding to the voltage held by the retaining circuit to the display electrode. The active matrix device of this invention further includes a circuit selection circuit which selectively connects one of the first and second display circuit to the drain signal line in response to a circuit selection signal, and a power line which supplies a predetermined voltage to the retaining circuit. This power line extends in one direction of the matrix and is commonly used by the retaining circuits of the pixel element electrodes forming a line of the matrix in that direction. The power line is also used by the retaining circuits of the pixel element electrodes forming another line of the matrix in the direction. The two lines are next to each other in the matrix.

In this configuration of the active matrix display device, which can select either the first or second display circuit, the number of the power lines can be reduced in half comparing to the case where the power line is disposed for each of the rows. Thus, it is possible to achieve the size reduction of the pixel element, leading to the overall size reduction of the active matrix display device.

In a preferred embodiment, each of the retaining circuits is connected to at least two driver power lines, which extend in one direction of the matrix and which provide different kind of voltage to each of the retaining circuit. Also, at least one of the driver power lines is commonly used for a plurality of the pixel elements adjacent in the other direction of the matrix.

Additionally, each of the retaining circuits is connected to at least two reference power lines, which extend in one direction of the matrix and each of which provides different kind of reference voltage to the retaining circuit. And the retaining circuit selects the reference voltage based on the retained data and supplies it to the pixel element electrode. Also, at least one of the reference power lines is commonly used for a plurality of the pixel elements adjacent in the other direction of the matrix.

Furthermore, the commonly used power line supplies the same voltage to all the retaining circuit.

Also, the commonly used power line is disposed near the pixel elements adjacent to each other in the other direction of the matrix. In the adjacent pixel elements in the other direction of the matrix, the retaining circuits are disposed symmetrically on the opposite side of the power line with the axis being between the adjacent pixel elements in the other direction of the matrix.

DESCRIPTION OF THE INVENTION

Figure 1:
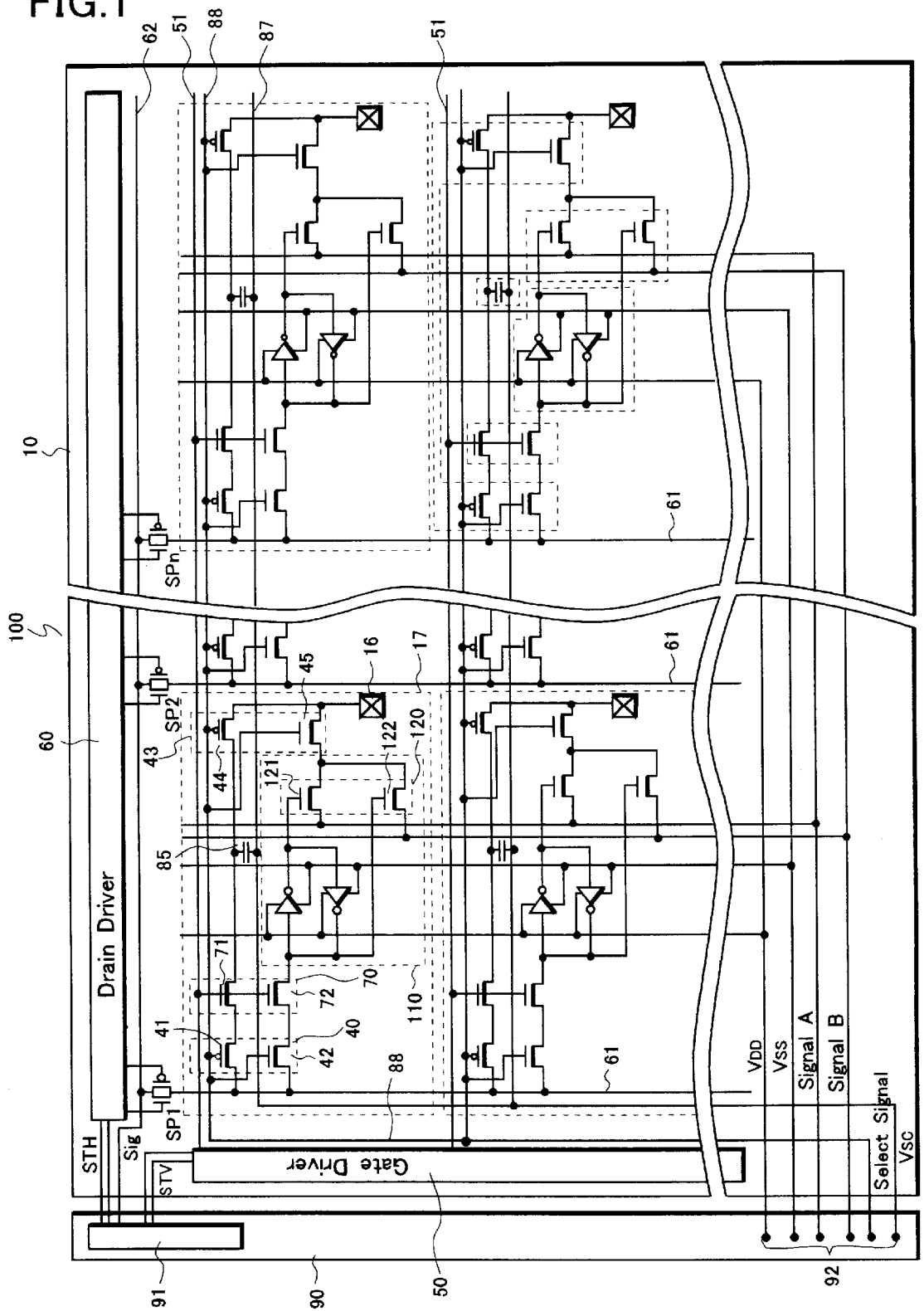
FIG. 1 is a circuit diagram showing the first embodiment of this invention.

Next, the display device of to the first embodiment of this invention will be explained. FIG. 1 shows a circuit diagram of a liquid crystal device to which the display device of this invention is applied.

In a liquid crystal display panel 100, a plurality of pixel element electrodes 17 are disposed in a matrix configuration on an insulating substrate 10. The matrix is defined by the lines of the pixel element electrodes both in row and columnar directions. A plurality of gate signal lines 51 connected to a gate driver 50 for providing gate signals are aligned in one direction. A plurality of drain signal lines 61 are aligned in the direction perpendicular to the direction of the gate signal lines 51.

Sampling transistors SP1, SP2 , , , SPn turn on in response to the timing of the sampling pulse fed from the drain driver 60, and connect the drain signal lines 61 to the data signal lines 62 carrying the data signal, which is the digital image signal or the analog image signal.

The gate driver 50 selects and feeds the gate signal to one of the gate signal lines 51. And the pixel element electrode 17 of the selected line receives the data signal fed from the drain signal line 61.

The detail of the configuration of each of the pixel elements will be explained below. A circuit selection circuit 40 having a P-channel circuit selection TFT 41 and a N-channel circuit selection TFT 42 is placed near the crossing of the gate signal line 51 and the drain signal line 61. The drains of circuit selection TFTs 41, 42 are connected to the drain signal line 61 and the gates of the two circuit selection TFTs are connected to the circuit selection signal line 88. One of the two circuit selection TFTs 41, 42 turns on in response to a selection signal fed from the circuit selection signal line 88. The circuit selection circuit 43 comprising a P-channel circuit selection TFT 44 and a N-channel circuit selection TFT 45 is provided to cooperate with the circuit selection circuit 40. The transistors of the circuit selection circuits 40 and 43 need to operate complimentarily, and the P-channel and the N-channel can be reversed. It is possible to omit one of the circuit selection circuits 40 and 43.

A pair of the two circuit selection circuits 40 and 43 enables the switching between the analog image display (full color moving image) which is the normal operation mode and the digital image display (still image and low energy consumption), which is the memory mode. A pixel element selection circuit 70 having a N-channel pixel element selection TFT 71 and a N-channel TFT 72 is placed next to the circuit selection circuit 40. The pixel element selection TFTs 71, 72 are connected to the circuit selection TFTs 41, 42 of the circuit selection circuit 40, and both gates of the TFTs 71, 72 are connected to the gate signal line 51. Both of the pixel element selection TFTs 71, 72 turn on at the same time in response to the gate signal fed from the gate signal line 51.

A storage capacitor element 85 holds the analog image signal in the analog mode. One of the electrodes of the storage capacitor element 85 is connected to the source of the pixel element selection TFT 71. Another electrode is connected to a common storage capacitor line 87 carrying a bias voltage Vcs. Also, the source of the pixel element selection TFT 71 is connected to the pixel element 17 through the circuit selection TFT 44 and the contact 16. After the opening of the gate of the pixel element selection TFT 70 by the gate signal, the analog image signal fed from the drain signal line 61 is inputted to the pixel element electrode 17 through the contact 16, and applied to drive the liquid crystal 21 as the pixel element voltage. The pixel element voltage should be retained during one field period after the selection by the pixel element selection TFT is lifted. However, relying only on the capacity of the liquid crystal, the pixel element voltage of the applied signal can not be retained even during one field period, resulting in a loss of the homogeneity of the displayed image. The storage capacitor element 85 maintains the applied voltage at the initial level during one field period for eliminating the problem above.

A P-channel TFT 44 of the circuit selection circuit 43 is placed between the storage capacitor element 85 and the pixel element electrode 17, and turns on and off in synchronization with the switching of the circuit selection TFT 41 of the circuit selection circuit 40. The operation mode, under which the circuit selection TFT 41 is on and in which the analog signal is successively applied to drive the liquid crystal, is called as the normal operation mode or the analog operation mode.

A retaining circuit 110 is placed between the TFT 72 of the pixel element selection circuit 70 and the pixel element electrode 17. The retaining circuit 110 has two inverter circuits, which are positively fed back to each other, and the signal selection circuit 120 and forms a static memory of digital divalent.

The signal selection circuit 120 has two N-channel TFTs 121, 122, and selects a signal in response to the signal fed from the two inverters. Since two complementary output signals from the two inverters are applied to the gates of the two TFTs 121, 122, respectively, only one of the two TFTs 121, 122 turns on at a time.

The AC drive signal Vcom (signal B) is selected when the TFT 122 turns on, and the AC drive signal (signal A), which is equal to the common electrode signal Vcom, is selected when the TFT 121 turns on. The selected signal is then applied to the pixel element electrode 17 of the liquid crystal 21 through the TFT 45 of the circuit selection circuit 43. The operation mode, under which the circuit selection TFT 42 is on and in which image is displayed based on the data retained in the retaining circuit, is called as the memory mode or the digital operation mode.

In summary, there is provided two kinds of circuits; the circuit (the analog display circuit) comprising the pixel element selection element TFT 71 and the storage capacitor element for holding analog image signal, and the circuit (the digital display circuit) comprising the pixel element selection element TFT 72 and the retaining circuit 110 for holding divalent digital image signal in single pixel element. There is also provided the circuit selection circuits 40, 43 for selecting the circuit.

The liquid crystal display panel 100 has peripheral circuit as well. A panel drive LSI 91 is mounted on an external circuit board 90 external to the insulating substrate 10 of the liquid crystal panel 100, and sends the vertical start signal STV and the horizontal start signal STH to the gate driver 50 and the drain driver 60 respectively. The panel drive LSI also feeds the image signal to the data line 62.

Next, the driving method of the display device with above configuration is explained.

(1) Normal Operation Mode (Analog Operation Mode)

When the analog display mode is selected in response to the display mode selection signal, the LSI 91 feeds the analog image signal to the data line 62, and the voltage applied to the circuit selection signal line 88 changes to L so that the circuit selection TFTs 41, 44 of the circuit selection circuits 40, 43 turn on, and the circuit selection TFTs 42 and 45 turn off.

The sampling transistor SP successively turns on in response to the sampling signal based on the horizontal start signal STH so that the analog image signal is provided to the drain signal line 61 through the data signal line 62.

The gate signal is provided to the gate signal line 51 in accordance with the vertical start signal STV. When the pixel element selection TFT 71 turns on in response to the gate signal, the analog image signal An. Sig is applied, through the drain signal line 61, to the pixel element electrode 17 and the storage capacitor element 85, which holds the applied voltage. The image signal voltage applied to the pixel element electrode 17 is then applied to the liquid crystal 21, which aligns itself in accordance with the voltage, resulting in a display image.

This analog display mode is suitable for showing a full color moving image because the image signal voltage is successively inputted. However, the external LSI 91 on the retrofitted circuit board 90, and drivers 50, 60 continuously consume the electric energy for driving the liquid crystal display device.

(2) Memory Mode (Digital Display Mode)

When the digital display mode is selected in response to the display mode selection signal, the LSI 91 is set to convert the image signal to the digital signal, extract the highest-bit digital signal and output it to the data signal line 62. At the same time, the voltage of the circuit selection signal line 88 turns to H. Then, the circuit selection TFTs 41, 44 of the circuit selection circuits 40, 43 turn off and the TFTs 42, 45 turn on. Thus, the retaining circuit 110 becomes operable.

The panel drive LSI 91 on the external circuit board 90 sends start signal STH to the gate driver 50 and the drain driver 60. In response to the start signal, sampling signals are sequentially generated and turn on the respective sampling transistors SP1, SP2 , , , SPn sequentially, which sample the digital image signal D. Sig and send it to each of the drain signal lines 61.

Now, the operation of the first row of the matrix, or the gate signal line 51, which receives the gate signal, G1, will be described below. First, the gate signal G1 turns on each pixel element selection TFT 72 of each of the pixel elements connected to the gate signal line 51, for one horizontal scanning period. In the pixel element located at the upper left corner of the matrix, the sampling transistor SP1 takes in the digital signal S11 and feeds it to the drain signal line 61. The pixel element selection TFT 72 turns on in response to the gate signal, and the digital signal D. Sig is inputted to the retaining circuit 110 and retained by the two inverters.

The signal retained by the inverters is then fed to the signal selection circuit 120, and is used by the signal selection circuit 120 to select one of the signal A and signal B. The selected signal is then applied to the liquid crystal 21 through the pixel element electrode 17.

Thus, after a completion of a scanning from the first gate signal line 51 on the top row of the matrix to the last gate signal line 51 on the bottom row of the matrix, a full display frame scan (one field scan), or a full dot scanning, is completed and the display device shows an image.

When the display device shows an image, the voltages supplied to the gate driver 50, the drain driver 60 and the external panel drive LSI 91 are stopped for halting the drive. The voltages Vdd, Vss are always supplied to the retaining circuit 110 for driving. Also, the common electrode voltage is supplied to the common electrode 32 and each of the signals A and B is supplied to the selection circuit 120.

When the voltages Vdd, Vss are supplied to the retaining circuit 110 and the common electrode voltage Vcom is applied to the common electrode 32, and when the liquid crystal display panel 100 is in a normally-white (NW) mode, the signal A receives the AC drive voltage which is the same voltage as the common electrode voltage and the signal B receives only the AC drive voltage (for example, of 60 Hz) for driving the liquid crystal. This makes it possible to hold the data and display one still image. Here, the voltage is not applied to the gate driver 50, drain driver 60 and external LSI 91.

When the retaining circuit 110 receives the digital image signal of H through the drain signal line 61, the first TFT 121 of the signal selection circuit 120 receives a L signal and accordingly turns off, and the second TFT 122 receives a H signal and turns on. In this case, the signal B is selected and the liquid crystal 21 receives the signal B having a phase opposite to the signal A, resulting in the rearrangement of the liquid crystal 21. Since the display panel is in a NW mode, a black image results.

When the retaining circuit 110 receives the digital image signal of L through the drain signal line 61, the first TFT 121 of the signal selection circuit 120 receives a H signal and accordingly turns on, and the second TFT 122 receives a L signal and turns off. In this case, the signal A is selected and the liquid crystal 21 receives the signal A, which is the same as the signal A applied to the common electrode 32. As a result, there is no change in the arrangement of the liquid crystal 21 and the pixel element stays white.

In this way, by writing and holding the data for displaying one image display, it is possible to display the data as a still image. In this case, each of the drivers 50, 60 and the LSI 91 stop their drive resulting in the reduction of the electric power consumption.

In the above embodiment, one bit digital signal is retained in the retaining circuit 110. However, if the retaining circuit is made compatible to the multiple bit, it is possible have multiple level display under the memory mode. Also, if the retaining circuit is made as the memory device capable of retaining the analog value, it is also possible to have a full color display under the memory mode.

As described above, the embodiment of this invention is capable of corresponding to the two kinds of display, a full color moving picture display (analog display mode), for which data is successively fed, and a digital level display (digital display mode) of low energy consumption within single liquid crystal display panel 100.

Figure 2:
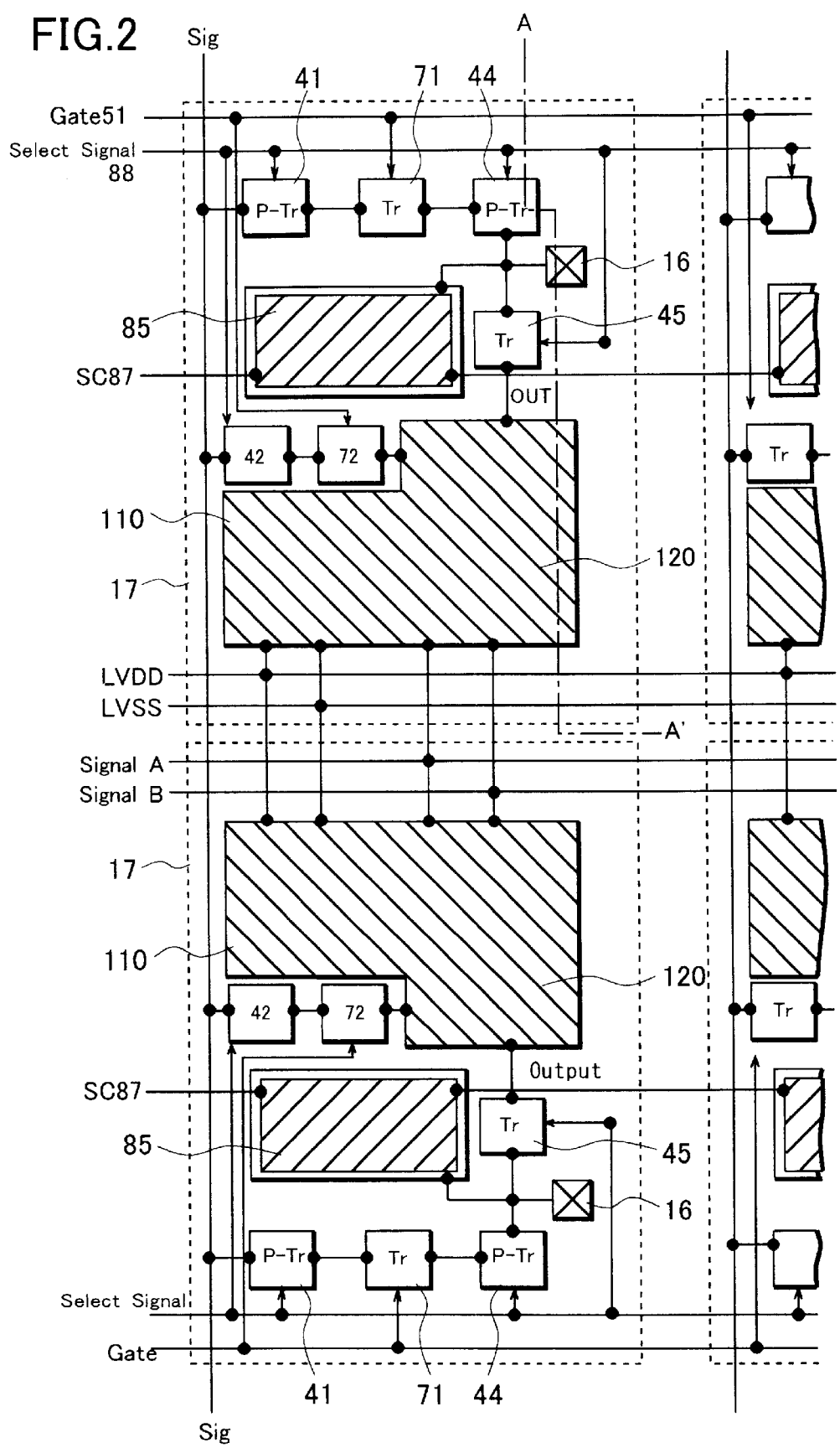
FIG. 2 is a schematic view showing the plan layout of the first embodiment of this invention.

Next, the layout of the embodiment will be explained by referring to FIG. 2. FIG. 2 is a schematic view showing the layout of the first embodiment. The circuit selection P-channel TFT 41 of the circuit selection circuit, the pixel element selection TFT 71 of the pixel element selection circuit and the P-channel TFT 44 of the circuit selection circuit are connected in series. They are also connected to the pixel element electrode 17 through the contact 16 and to the storage capacitor element 85.

Also, the circuit selection TFT 42, the retaining circuit 110, and the N-channel TFT 45 of the circuit selection circuit are connected to the pixel element electrode 17 through the contact 16. All these elements are placed in the area for the pixel element electrode 17.

The circuit configuration in each of the pixel elements is almost the same. The circuit disposition in the two pixel elements adjacent to each other in the columnar direction of the matrix is symmetrical with the axis of symmetry being located between the two pixel elements. That is, in the pixel element in the first row of the figure, the gate signal line 51 is disposed in the upper edge of the pixel element and the retaining circuit 110 is disposed in the lower half of the pixel element. And in the pixel element in the second row of the figure, the gate signal line 51 is disposed in the lower edge of the pixel element and the retaining circuit 110 is disposed in the upper half of the pixel element. In the pixel element in the third column, which is not shown in the figure, the gate signal line 51 is disposed in the upper edge and the retaining circuit 110 is disposed in the lower half of the pixel element, as in the pixel element of the first row.

The retaining circuit 110 is, as stated above, SRAM. Four power lines, namely two different kinds of drive power lines, a low voltage and high voltage power lines (LVDD, LVSS) as well as two different kinds of reference power lines, a low and high reference power lines (signal A and signal B) are connected to the retaining circuit 110. These power lines extend in row direction and are commonly used for each of the pixel elements in the row, as in the case of the gate signal line 51 and the storage capacitance line 87. These facts stated above apply to the circuit disposition of each of the pixel elements. In this embodiment, however, the circuit layout differs among the pixel elements. The layouts of the pixel elements adjacent to each other in columnar direction are symmetrical with the row axis. The retaining circuits 110 of the pixel elements adjacent to each other in columnar direction are disposed close to each other with four power lines between them. The retaining circuits 110 located at the both sides of the power lines share these four power lines. That is, each of these power lines is disposed for every two rows of pixel elements and connected to all the retaining circuits corresponding to the two rows of pixel elements. Therefore, comparing to the case where one power line extending in the row direction is disposed for every row of the pixel element, the number of the power lines can be reduced in half in this embodiment. Since the number of the circuits formed for each pixel element is considerably large, in the active matrix display device with retaining circuit, the size reduction of the components of the circuit can directly lead to the size reduction of the pixel element. Thus, this embodiment can contribute to the size reduction of the display device with the retaining circuit.

The gate signal line 51, for example, should be turned on in different timing for each of the rows, and thus can not be shared with different rows of the matrix. However, the commonly used four power lines in this embodiment are the lines for supplying the driver voltage and the reference voltage of the retaining circuit 110. These power lines continue supplying the voltage commonly applied to the retaining circuit 110 of each of the pixel elements, whether the particular pixel element is selected or not selected, or whether the state of the display is black or white. Thus, these lines can be shared by a plurality of the rows of the matrix. Also from the same reason, the power line can be shared by the pixel elements in different rows adjacent to each other, if the active matrix display device is designed to display color image. That is, this invention is applicable not only to the stripe configuration, in which the pixel elements for the same color line up in columnar direction, but also to the delta configuration, in which the pixel elements for R, G, and B are aligned alternately.

Figure 3:
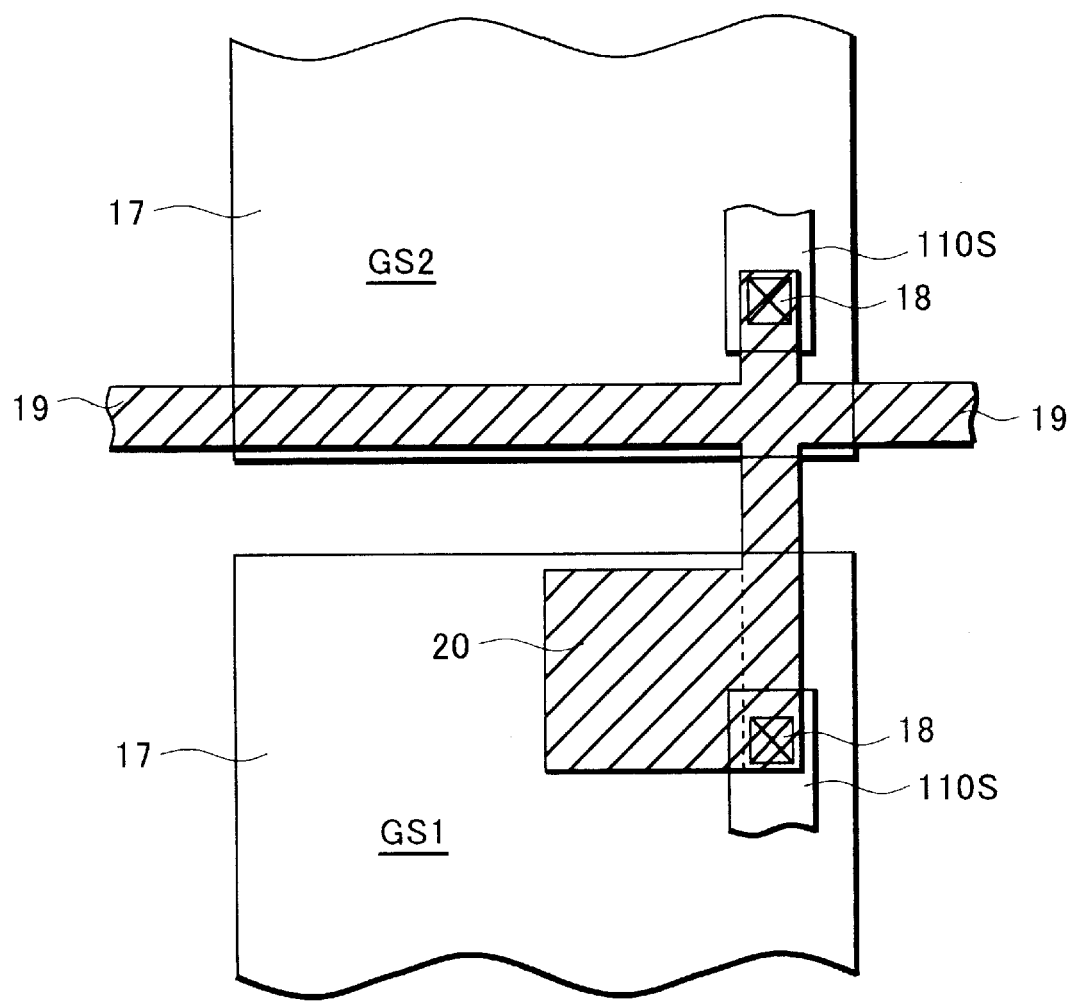
FIG. 3 is a schematic view showing the plan layout of the power line of the first embodiment of this invention.
Figure 4:
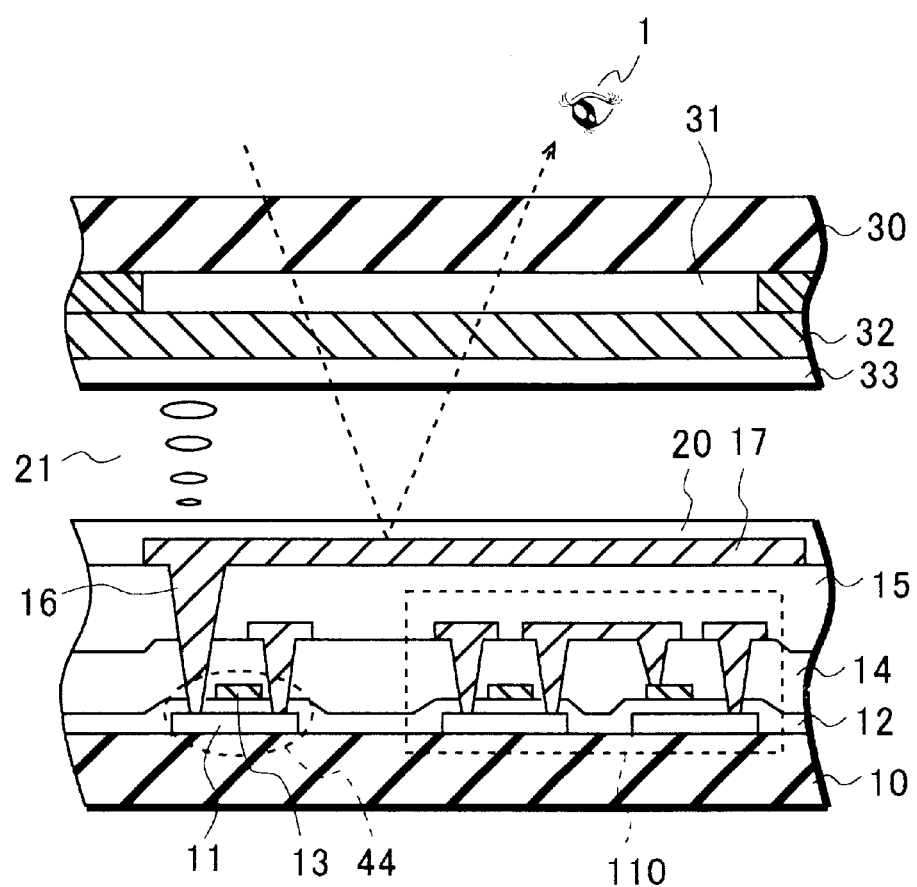
FIG. 4 shows a cross-sectional view of this invention.

Next, the relationship between the four power lines stated above and the pixel element electrode 17 in the layout is explained. FIG. 3 is a schematic view of the layout of the area between pixel elements GS1 and GS2, which are adjacent to each other in the columnar direction in FIG. 2. As shown in the figure, the power line 19 (the power line LVDD supplied to the SRAM of the retaining circuit 110 in the figure) shared by the two pixel elements GS1 and GS2 is formed over the electrode 17 of the element GS2. On each pixel electrode 17, the power line is connected to each of the sources 110S of the thin film transistor (TFT) of the SRAM through each of the contacts 18.

In this layout, the parasitic capacitance is formed between the pixel element electrode 17 of the pixel element GS2 and the power line 19 through an insulating film formed between them. This parasitic capacitance is large compared to the parasitic capacitance formed between the pixel element electrode 17 of the pixel element GS1 and the power line 19. Thus, the influence of the parasitic capacitance on the pixel element electrodes 17 becomes uneven among the two pixel elements. Therefore, the influence of the parasitic capacitance becomes noticeable alternately among the pixel elements, resulting in the horizontal or vertical stripes in the display, and thus leading to the deterioration of the display quality.

In this embodiment, an extra conducting area 20 is formed as an extension of the power line on the electrode 17 of the element GS1 with an insulating film in between. This also enlarges the parasitic capacitance between the pixel element electrode 17 of the pixel element GS1 and the power line 19. Therefore, the parasitic capacitance of the GS1 and GS2 becomes even, leading to the elimination of the influence of the difference in parasitic capacitance. Here, it is preferable that the parasitic capacitance formed between the pixel element electrode 17 and the power line 19 be equal between the pixel elements GS1 and GS2 with the formation of the conducting area 20, which is made as the extension of the power line 19 on the pixel element electrode 17.

Also, the power line 19 is not necessarily be the high voltage driver line (LVDD) of the retaining circuit. It can be the reference power line (signal A, signal B), the low voltage driver line (LVSS) of the retaining circuit, or the reference power line that transmits the signal B.

In this layout, the power line 19 directly makes capacitance coupling by being disposed in the area of the pixel element electrode 17. However, the power line 19 is not necessarily placed in the area of the pixel element electrode 17. For example, when the source of the TFT and the pixel element electrode 17 is connected though the intermediate electrode layer, the power line 19 can make the capacitance coupling with the pixel element electrode 17 indirectly through the intermediate electrode layer. Therefore, by the same token, the conducting area 20 is not necessarily located in the area of the pixel element electrode 17. As stated above, the same effect can be expected if the conducting area 20 is placed on the intermediate electrode layer.

The LCD of this embodiment is a reflection-type LCD. FIG. 3 shows a cross section along the A–A' line of FIG. 2 of the reflection-type LCD of the embodiment.

The reference numeral 10 is an insulating substrate on one side of the display device, and the element denoted by the reference numeral 11 is an isolated polysilicon semiconductor layer 11 on the substrate 10. A gate insulating film 12 is formed on top of the polysilicon semiconductor layer 11, and a gate electrode 13 is formed on the portion of the insulating film 12 corresponding to the polysilicon semiconductor layer 11. A source and a drain are formed in the semiconductor layer 11 at the portions located at both sides of the gate electrode 13. As the interlayer insulating film 14 is deposited above the gate electrode 13 and the gate insulating layer 12. Contacts are formed at the portions of the interlayer insulating film 14 corresponding to the drain and the source. The drain is connected to a pixel element selection TFT 71 through the contact, and the source is connected to a pixel element electrode 17 through the contact 16. The pixel element electrode 17 is formed on the flattening insulating film 15 and is made of a reflecting electrode material, for example, aluminum (Al). An orientation film 20 is formed on the pixel element electrode 17 and the flattening insulating film 15. The orientation film 20 is made of polyimid and aligns the liquid crystal 21.

The insulating substrate 30 on the other side of the display device has color filter 31 for generating red (R), green (G), and blue (B) colors, a common electrode 32 made of a transparent electrode material such as ITO (indium tin oxide), and an orientation film 33 for aligning the liquid crystal 21. When the image is not shown in color display, the color filter 31 is not necessary.

The liquid crystal 21 fills the gap between the two insulating substrates 10, 30, which are attached together by sealing the peripheral portions of the two insulating substrates with a sealing adhesive.

In the reflection-type LCD, the light coming from the insulating substrate 30 side is reflected by the pixel element electrode 17 so that the observer 1 recognizes the light modulated by the liquid crystal 21 of the display device.

Since the pixel element electrode 17 of the reflection-type LCD does not transmit light, the light manipulation area of the device is not influenced by the elements placed under the pixel element electrode 17. By placing the retaining circuit, which requires relatively large area, under the pixel element electrode 17, the space between the pixel elements can be about the same as that in the normal LCD. All the elements are not necessarily placed under the pixel element electrode as shown in the embodiment of this invention. It is also possible to place a part of the elements between the pixel element electrodes.

Figure 5:
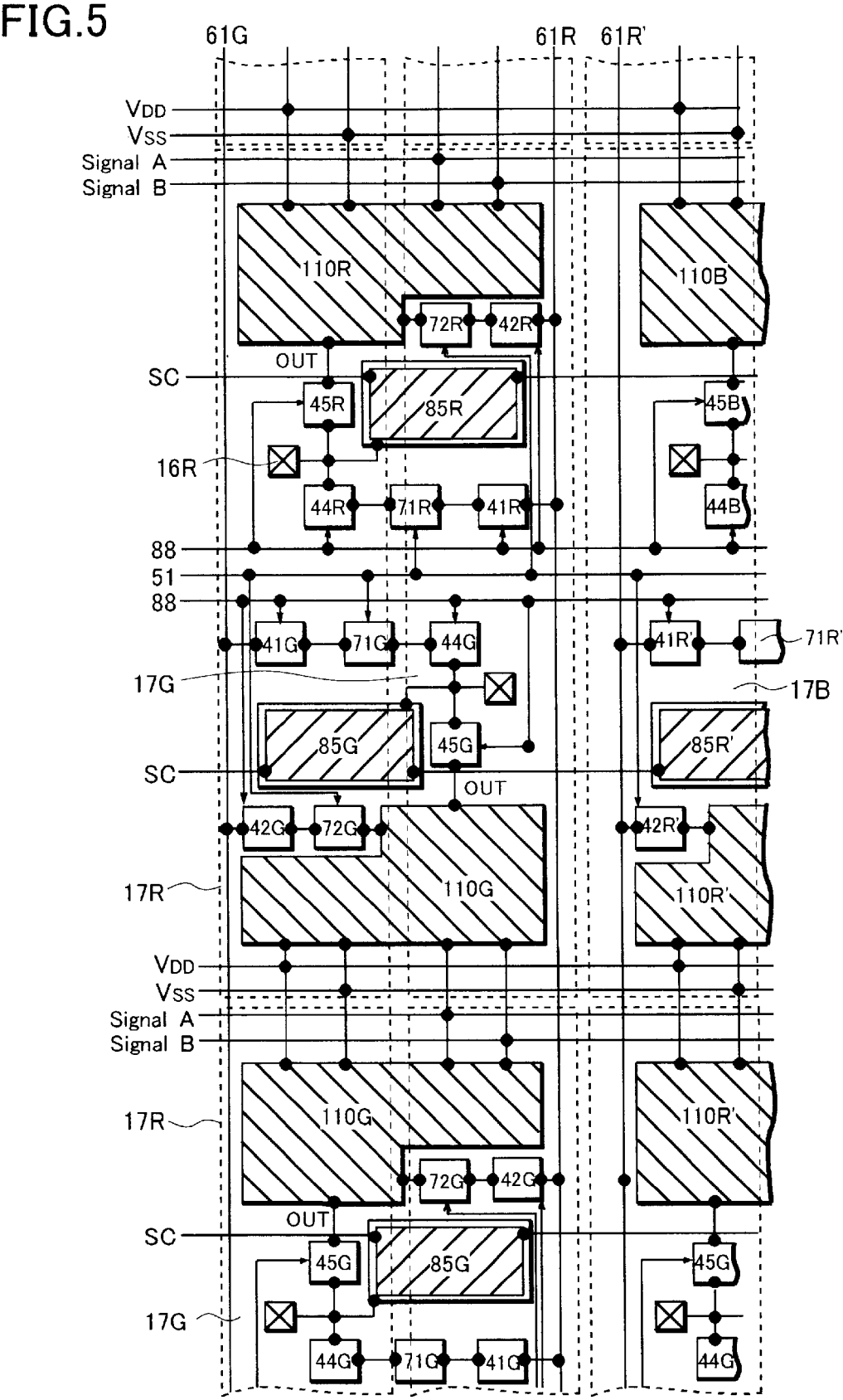
FIG. 5 is a schematic view showing the plan layout of the second embodiment of this invention.
Figure 6:
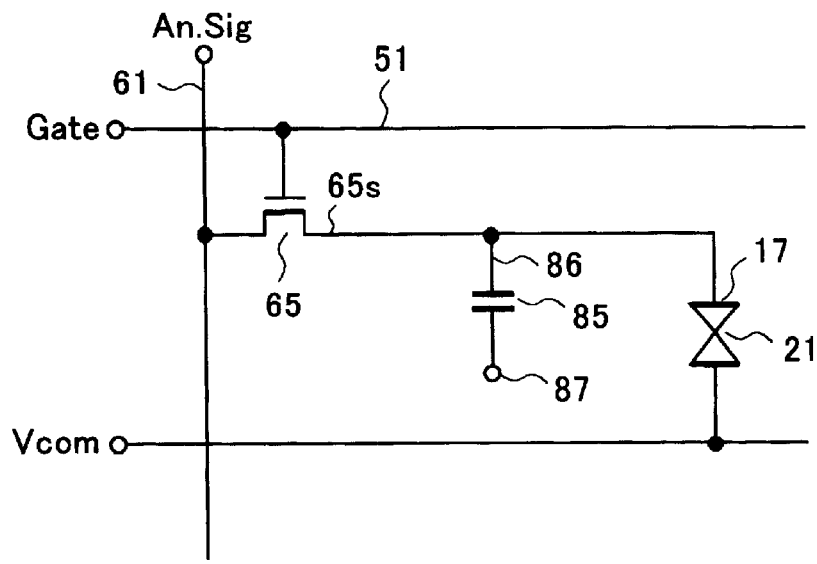
FIG. 6 is a circuit diagram showing one pixel element of the liquid crystal display device.
Figure 7:
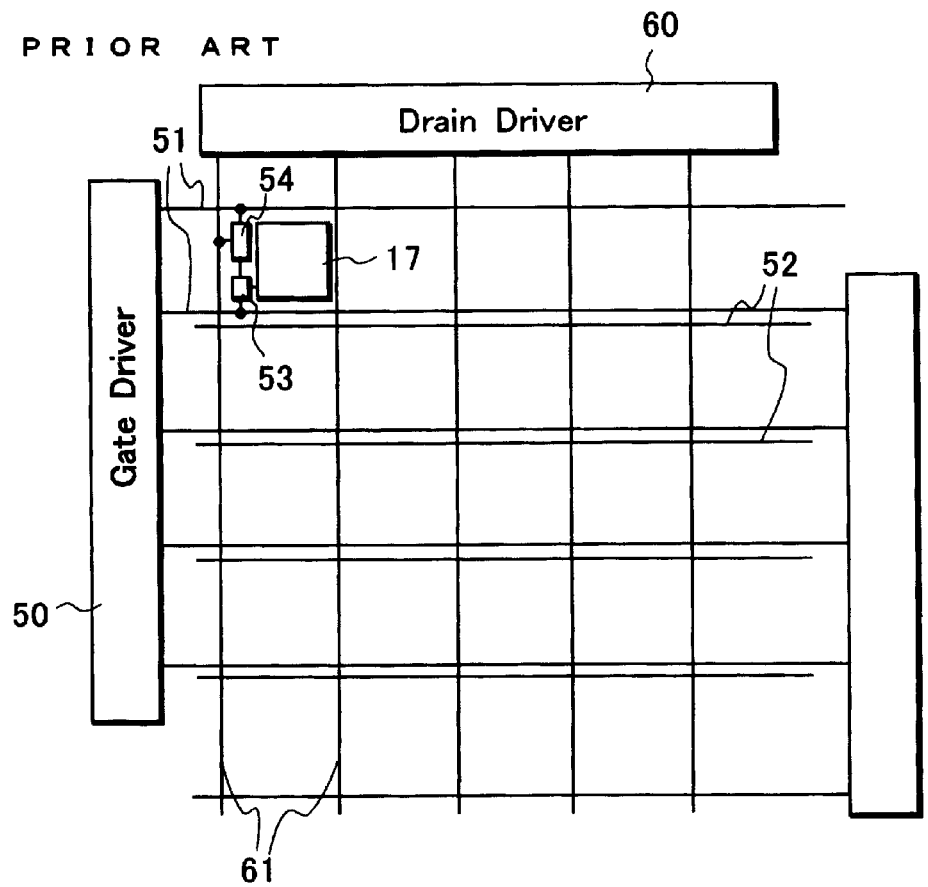
FIG. 7 is a circuit diagram of the conventional display device with a retaining circuit.
Figure 8:
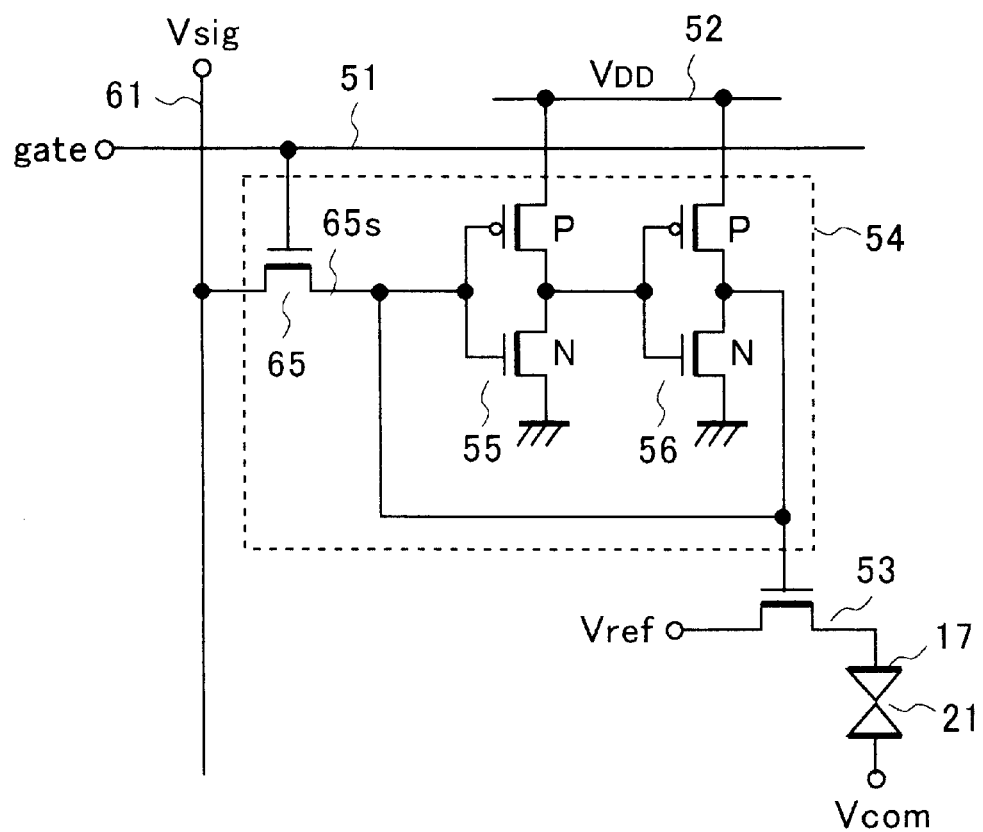
FIG. 8 is a circuit diagram of one pixel element of the conventional liquid crystal display device with a retaining circuit.

Next, the second embodiment of this invention will be explained by referring to FIG. 5. FIG. 5 is a schematic view showing the plan layout of the second embodiment of this invention.

In this embodiment, the R (red), G (green), and B (blue) pixel elements are aligned in stripes. Each of the pixel element electrodes 17 has the color filter corresponding to one of the R, G, and B colors, and will be called 17R, 17G, and 17B. Each of the R, G, and B pixel elements has the same circuit shown in FIG. 2 and each pixel element can retain its pixel element data in the retaining circuit 110.

One of the characteristics of this embodiment is the fact that the layout of the pixel element electrode 17 is different from the circuit layouts for the retaining circuit, selection circuit and storage capacitor element. This characteristic will be explained in detail hereinafter. As to the pixel element electrode 17R, it is placed at the left end of the figure and has a rectangular shape having the longer side in vertical direction. 16R denote the contact that connects the pixel element electrode 17R and its circuit. The circuit selection TFTs 41R, 44R, and the pixel element selection TFT 71R are connected in series, and a part of them extends to the neighboring pixel element electrode 17G. Likewise, the storage capacitor element 85R and the retaining circuit 110R extends to the pixel element electrode 17G. The pixel element electrode 17G is connected to the corresponding circuit through the contact 16G and the circuit selection circuit TFT 41G. The pixel element selection TFT 71G, the storage capacitor element 85G and the retaining circuit 110G are disposed such that the placement of these elements is confined to the area of the neighboring pixel element electrode 17R.

The circuits corresponding to the pixel element electrode 17R, 17G share the gate signal line 51 and are disposed symmetrically around a center of the symmetry located at a predetermined portion on the gate signal line. In the same manner, the circuit corresponding to the pixel element electrode 17B extends to the neighboring pixel element electrode not shown in the figure. This neighboring pixel element electrode is denoted by 17R', and the placement of the pixel element electrode 17R' is confined to the area of the pixel element electrode 17B.

The advantage of this arrangement will be explained. For example, suppose three colors R, G, B are used as one picture element. If this picture element is used as a square, each of the R, G, and B pixel elements should have rectangular shape with the ratio of length to width being 3:1. Generally, each of the R, G, B pixel elements disposed in stripes has a rectangular shape with the longer side in one direction. It is difficult to design the circuit if the retaining circuit is to be placed under the rectangular pixel element electrode 17. However, since the layout of the pixel element electrode 17 and the layout of the retaining circuit are different from each other in this embodiment, it is possible to reduce the detour of the wiring, resulting in the efficient use of the space. Thus, the space required for the retaining circuit can be reduced. In case of the LCD with the retaining circuit, the space occupied by the retaining circuit determines the minimum size of one pixel element. Therefore, the reduction in size of the retaining circuit directly results in the size reduction of the LCD.

Next, the advantage of the symmetric disposition of the circuits around the gate signal line will be explained. When neighboring pixel elements share certain area, it is necessary to make adjustment in the circuit layout of each of the pixel elements. But, if the two neighboring pixel elements are symmetrically disposed around a center of symmetry, after the circuit design for one pixel element, the circuit design for the other pixel element can be completed by mirroring, resulting in the improved efficiency of the circuit design. However, the connections to the four power lines (Vdd, Vss, signal A, signal B) at upper and lower sides of the figure need an adjustment. Also, if the circuit layout of the two adjacent pixel elements is not based on the point symmetry, but merely moving elements parallel to each other, the gate signal lines of the two pixel elements are apart from each other. Thus, it is necessary to have two gate signal lines. However, the circuits are disposed symmetrically around a center point in this embodiment, and thus, only one gate signal line is required. Also, in case that the retaining circuit 110 is a SRAM, four power lines (Vdd, Vss, two kinds of reference line (signal A and signal B) can be omitted. These power lines are commonly used by all the pixel elements. These power lines can also be shared by the two vertically adjacent pixel elements when the circuits are symmetrically disposed. In this manner, if the wiring is shared by a plurality of the pixel elements, it is possible to reduce the size of the LCD. It is preferable that the LCD be the reflection-type LCD like in the first embodiment.

Also in this embodiment, as in the first embodiment, the retaining circuit is disposed at the upper or lower edge of the pixel element. And the retaining circuits of the pixel elements adjacent to each other in the columnar direction are disposed close to each other with the four power lines (VDD, VSS, signal A, signal B) between them, and share these power lines. Thus, as in the first embodiment, the number of the power line can be reduced in half compared to the case where the power line is disposed for every row of the matrix.

In the first and second embodiments described above, four power lines are shared by the pixel elements adjacent to each other. However, it is not necessary for all the four power lines to be shared. When the four power lines are placed close to each other, at least one line is connected to the retaining circuit over the three other lines, resulting in the formation of parasitic capacitance. Also, in some cases, overall efficiency of the layout is better if the one of the power lines is disposed between the retaining circuit 110 and the storage capacitor element 85 of this embodiment. In those cases, among the four power lines, any line can be shared.

In the first and second embodiments of this invention, since the power lines are commonly used, the circuit dispositions are not in a perfect symmetry. Thus, in some cases, the parasitic capacitance formed between the power line and the pixel element electrode 17 differs among pixel elements. Thus, the signal delay may differ among the pixel elements, leading to the deterioration of the display quality. Thus, it is necessary to equalize the parasitic capacitance among the pixel elements. When the number of the power lines is 2n (where n is a natural number), n power lines should be superimposed on each of the pixel elements. When the number of the power lines is 2n+1, n power lines should be superimposed on each of the pixel elements and the remaining one line should be placed between the pixel elements.

In the first and second embodiments, it is explained that the four power lines (VDD, VSS, signal A, signal B) extend in row direction and are commonly used for the pixel elements adjacent to each other in columnar direction. However, as shown in FIG. 1, it is also possible for the power lines to extend in columnar direction. In this case, the circuit disposition of the pixel element is in a symmetry with the axis of the symmetry being located between the columns. Similarly, the power lines are shared, achieving the same effect as in the first and second embodiments. However, there is little room in the layout in the columnar direction, especially in the case of the stripe alignment as in the second embodiment. Therefore, the layout where the power lines extend in row direction is more efficient in these cases.

In the above embodiments, the reflection-type LCD is used for explanation. But this invention is not limited to that embodiment. Above embodiment can be applied to the transmitting-type LCD as well by placing the transparent pixel element electrode on the retaining circuit. However, in the transmitting-type LCD, the light is shut off where the metal wiring is used. Thus the reduction in the light manipulation area is inevitable. Also, if the retaining circuit is disposed under the pixel element electrode in the transmitting-type LCD, there is a possibility for the transistors in the retaining circuit and the selection circuit to operate incorrectly due to the light coming from outside. Thus, it is necessary to place the light-blocking film on all the transistors. Accordingly, it is difficult to increase the light manipulation area in the transmitting-type LCD. However, in the reflection-type LCD, the circuits placed under the pixel element electrode do not influence the numeral aperture. Furthermore, unlike the transmitting-type, the reflection-type liquid crystal display device dose not need a back light in the side opposite to the observer and thus does not need the electric energy for lightening the back light. The original purpose of the LCD with the retaining circuit is to reduce the electric energy consumption. Thus, it is preferable that this invention be applied to the reflection-type LCD which does not need a back light and which is suitable for the reduction of the electric energy consumption.

As explained, in the active matrix display device with the retaining circuit corresponding to the pixel element electrode, the power line that is connected to the retaining circuit extends in one direction, for example, in row direction of the matrix. The power line is commonly used for the retaining circuits corresponding to the pixel element electrodes aligned in the row direction, and is also used for the retaining circuits corresponding to the pixel element electrodes adjacent in the columnar direction of the matrix. Thus, the number of the power lines can be reduced in half comparing to the case where the power line is provided for each of the rows. This invention allows the size reduction of the pixel element, leading to the overall size reduction of the active matrix display device.

Since the shared power line supplies the same voltage to all the retaining circuits, they can be commonly used by the pixel element electrodes in both columnar and row directions of the matrix.

The shared power line is disposed between the pixel elements adjacent to each other in columnar or row direction. The disposition of the retaining circuits of the pixel elements adjacent to each other in columnar or row direction is symmetrical Thus, it is possible to improve the layout efficiency, because the length of the wiring connecting the shared power line to the retaining circuit can be made short.

The above is a detailed description of particular embodiments of this invention. It is recognized that departures from the disclosed embodiments may be made within the scope of the invention and that obvious modifications will occur to a person skilled in the art. The full scope of the invention is set out in the claims that follow and their equivalents. Accordingly, the claims and specification should not be construed to narrow the full scope of protection to which the invention is entitled.

What is claimed is:

1. An active matrix display device including a plurality of pixel element electrodes disposed as a matrix, a plurality of gate signal lines disposed in a row direction of the matrix, a plurality of drain signal lines disposed in a columnar direction of the matrix, said pixel element electrode being selected by a scanning signal from the gate signal line and provided with an image signal from the drain signal line, said active matrix display device comprising:

a plurality of first display circuits each passing the image signal fed from a corresponding drain signal line to a corresponding pixel element electrode selected by the scanning signal inputted from a corresponding gate signal line;

a plurality of second display circuits each having a retaining circuit which retains the image signal fed from the corresponding drain signal line in response to the scanning signal inputted from the corresponding gate signal line, said second display circuit supplying a signal corresponding to the image signal held by the retaining circuit to the corresponding pixel electrode;

a plurality of circuit selection circuits each selectively connecting a corresponding first display circuit or a corresponding second display circuit to the corresponding drain signal line in response to a circuit selection signal;

a power line which supplies a predetermined voltage to the retaining circuits, said power line extending in one direction of the matrix and being commonly used by the retaining circuits for the pixel element electrodes forming a line of the matrix in said direction, said power line being also used by the retaining circuits for the pixel element electrodes forming another line of the matrix in the direction, said line of the matrix being next to said another line of the matrix; and another power line supplying another predetermined voltage to the retaining circuits forming said line of the matrix, said power line and said another power line being driver power lines.

2. The active matrix display device of claim 1, wherein at least one of the two driver power lines is capacitance coupled to the pixel element electrodes forming said line of the matrix and is extended to the pixel element electrodes forming said another line of the matrix to form a capacitance coupling thereto.

3. The active matrix display device of claim 1, wherein at least one of the two driver power lines is formed over the pixel element electrodes forming said line of the matrix through an insulating film and is extended to the pixel element electrodes forming said another line of the matrix to form a conducting area thereon through an insulating film.

4. An active matrix display device including a plurality of pixel element electrodes disposed as a matrix, a plurality of gate signal lines disposed in a row direction of the matrix, a plurality of drain signal lines disposed in a columnar direction of the matrix, said pixel element electrode being selected by a scanning signal from the gate signal line and provided with an image signal from the drain signal line, said active matrix display device comprising:

a plurality of first display circuits each passing the image signal fed from a corresponding drain signal line to a corresponding pixel element electrode selected by the scanning signal inputted from a corresponding gate signal line;

a plurality of second display circuits each having a retaining circuit which retains the image signal fed from the corresponding drain signal line in response to the scanning signal inputted from the corresponding gate signal line, said second display circuit supplying a signal corresponding to the image signal held by the retaining circuit to the corresponding pixel electrode;

a plurality of circuit selection circuits each selectively connecting a corresponding first display circuit or a corresponding second display circuit to the corresponding drain signal line in response to a circuit selection signal;

a power line which supplies a predetermined voltage to the retaining circuits, said power line extending in one direction of the matrix and being commonly used by the retaining circuits for the pixel element electrodes forming a line of the matrix in said direction, said power line being also used by the retaining circuits for the pixel element electrodes forming another line of the matrix in the direction, said line of the matrix being next to said another line of the matrix; and another power line supplying another predetermined voltage to the retaining circuits forming said line of the matrix, said power line and said another power line being reference power lines, wherein one of reference voltages of the two reference power lines is selected according to the image signal held by the retaining circuit, said selected reference voltage being applied to the pixel element electrode.

5. The active matrix display device of claim 4, wherein at least one of the two reference power lines is capacitance coupled to the pixel element electrodes forming said line of the matrix and is extended to the pixel element electrodes forming said another line of the matrix to form a capacitance coupling thereto.

6. The active matrix display device of claim 4, wherein at least one of the two reference power lines is formed over the pixel element electrodes forming said line of the matrix through an insulating film and is extended to the pixel element electrodes forming said another line of the matrix to form a conducting area thereon through an insulating film.

7. The active matrix display device of claims 1, wherein said power line supplies the same voltage to all the retaining circuits of the display device.

8. An active matrix display device including a plurality of pixel element electrodes disposed as a matrix, a plurality of gate signal lines disposed in a row direction of the matrix, a plurality of drain signal lines disposed in a columnar direction of the matrix, said pixel element electrode being selected by a scanning signal from the gate signal line and provided with an image signal from the drain signal line, said active matrix display device comprising:

a plurality of first display circuits each passing the image signal fed from a corresponding drain signal line to a corresponding pixel element electrode selected by the scanning signal inputted from a corresponding gate signal line;

a plurality of second display circuits each having a retaining circuit which retains the image signal fed from the corresponding drain signal line in response to the scanning signal inputted from the corresponding gate signal line, said second display circuit supplying a signal corresponding to the image signal held by the retaining circuit to the corresponding pixel electrode;

a plurality of circuit selection circuits each selectively connecting a corresponding first display circuit or a corresponding second display circuit to the corresponding drain signal line in response to a circuit selection signal; and a power line which supplies a predetermined voltage to the retaining circuits, said power line extending in one direction of the matrix and being commonly used by the retaining circuits for the pixel element electrodes forming a line of the matrix in said direction, said power line being also used by the retaining circuits for the pixel element electrodes forming another line of the matrix in the direction, said line of the matrix being next to said another line of the matrix, wherein the power line is disposed between the pixel element electrodes forming said line of the matrix and the pixel element electrodes forming said another line of the matrix, and a pixel element electrode in said line of the matrix and a pixel electrode in said another line of the matrix, which occupy an identical position in the two lines of the matrix, are disposed symmetrically to each other relative to a center line of a space between the two electrodes or a center of said space.

9. An active matrix display device, comprising:

a first pixel element electrode;

a second pixel element electrode disposed adjacent the first pixel element electrode;

a first retaining circuit disposed at least under the first pixel element electrode and holding an image signal;

a second retaining circuit disposed at least under the second pixel element electrode and holding the image signal;

a first power line supplying a first predetermined voltage to the first and second retaining circuits; and a second power line supplying a second predetermined voltage to the first and second retaining circuits, wherein the first power line is disposed at least partially under the first pixel element electrode and is not disposed under the second pixel element electrode, and the second power line is disposed at least partially under the second pixel element electrode and is not disposed under the first pixel element electrode.

10. The active matrix display device of claim 9, further comprising a third pixel element electrode disposed adjacent the first pixel element electrode and a fourth pixel element electrode disposed adjacent the second pixel element electrode, wherein the first retaining circuit is disposed partially under the third pixel element electrode and the second retaining circuit is disposed partially under the fourth pixel element electrode.

11. An active matrix display device, comprising:

a plurality of pixel element electrodes disposed as a matrix;

a plurality of retaining circuits provided for the pixel element electrodes, each of the retaining circuits holding a voltage determining an application of a voltage to a corresponding pixel element electrode;

a power line which supplies a predetermined voltage to the retaining circuits, the power line extending in one direction of the matrix and being commonly used by the retaining circuits for the pixel element electrodes forming a line of the matrix in the direction, the power line being also used by the retaining circuits for the pixel element electrodes forming another line of the matrix in the direction, the line of the matrix being next to the another line of the matrix; and another power line supplying another predetermined voltage to the retaining circuits forming the line of the matrix, the power line and the another power line being driver power lines.

12. An active matrix display device, comprising:

a plurality of pixel element electrodes disposed as a matrix;

a plurality of retaining circuits provided for the pixel element electrodes, each of the retaining circuits holding a voltage determining an application of a voltage to a corresponding pixel element electrode;

a power line which supplies a predetermined voltage to the retaining circuits, the power line extending in one direction of the matrix and being commonly used by the retaining circuits for the pixel element electrodes forming a line of the matrix in the direction, the power line being also used by the retaining circuits for the pixel element electrodes forming another line of the matrix in the direction, the line of the matrix being next to the another line of the matrix; and another power line supplying another predetermined voltage to the retaining circuits forming the line of the matrix, the power line and the another power line being reference power lines, wherein one of reference voltages of the two reference power lines is selected according to the image signal held by the retaining circuit, the selected reference voltage being applied to the pixel element electrode.

13. An active matrix display device, comprising:

a plurality of pixel element electrodes disposed as a matrix;

a plurality of retaining circuits provided for the pixel element electrodes, each of the retaining circuits holding a voltage determining an application of a voltage to a corresponding pixel element electrode; and a power line which supplies a predetermined voltage to the retaining circuits, the power line extending in one direction of the matrix and being commonly used by the retaining circuits for the pixel element electrodes forming a line of the matrix in the direction, the power line being also used by the retaining circuits for the pixel element electrodes forming another line of the matrix in the direction, the line of the matrix being next to the another line of the matrix, wherein the power line is disposed between the pixel element electrodes forming the line of the matrix and the pixel element electrodes forming the another line of the matrix, and a pixel element electrode in the line of the matrix and a pixel electrode in the another line of the matrix, which occupy an identical position in the two lines of the matrix, are disposed symmetrically to each other relative to a center line of a space between the two electrodes or a center of the space.

* * * * *